United States Patent
Kimura et al.

(10) Patent No.: US 9,428,199 B2
(45) Date of Patent: Aug. 30, 2016

(54) RAILCAR BOGIE PLATE SPRING

(75) Inventors: Gaku Kimura, Gotenba (JP);
Mitsuhiro Furuya, Fuji (JP); Shunichi Nakao, Kobe (JP); Takehiro Nishimura, Kobe (JP)

(73) Assignees: GH CRAFT LTD., Gotenba-shi (JP); KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 71 days.

(21) Appl. No.: 14/345,616

(22) PCT Filed: Sep. 13, 2012

(86) PCT No.: PCT/JP2012/005837
§ 371 (c)(1),
(2), (4) Date: Apr. 29, 2014

(87) PCT Pub. No.: WO2013/038673
PCT Pub. Date: Mar. 21, 2013

(65) Prior Publication Data
US 2015/0000553 A1  Jan. 1, 2015

(30) Foreign Application Priority Data

Sep. 15, 2011 (JP) .................................. 2011-202119

(51) Int. Cl.
*B61F 5/02* (2006.01)
*B61F 5/30* (2006.01)
(Continued)

(52) U.S. Cl.
CPC .................. *B61F 5/30* (2013.01); *B61F 5/523* (2013.01); *F16F 1/368* (2013.01); *Y02T 30/38* (2013.01)

(58) Field of Classification Search
CPC .............. B61F 5/00; B61F 5/02; B61F 5/04; B61F 5/06

USPC ............. 105/157.1, 182.1, 193, 194, 197.05, 105/197.1, 197.2
See application file for complete search history.

(56) References Cited

U.S. PATENT DOCUMENTS 3,814,410 A  6/1974  Fukui et al.
3,948,188 A  4/1976  Zehnder
(Continued)

FOREIGN PATENT DOCUMENTS

DE  102009058170 A1  6/2011
EP  0 082 321 A2  6/1983
(Continued)

OTHER PUBLICATIONS

Jun. 10, 2015 extended Search Report issued in European Patent Application No. 12831903.5.
(Continued)

*Primary Examiner* — R. J. McCarry, Jr.
(74) *Attorney, Agent, or Firm* — Oliff PLC

(57) ABSTRACT

A railcar bogie plate spring of the present invention includes: an upper surface member constituted by fiber reinforced plastic in which reinforced fibers are stacked so as to extend in a longitudinal direction; a lower surface member constituted by fiber reinforced plastic in which reinforced fibers are stacked so as to extend in the longitudinal direction; and a core member arranged between the upper surface member and the lower surface member. The core member is constituted by fiber reinforced plastic in which: reinforced fibers are stacked in a width direction perpendicular to a stack direction of the upper surface member and the lower surface member; and in a side view of the core member, the reinforced fibers are inclined relative to a bending neutral axis so as to intersect with one another.

19 Claims, 13 Drawing Sheets

(51) Int. Cl.
  *B61F 5/52*  (2006.01)
  *F16F 1/368* (2006.01)

(56) References Cited

U.S. PATENT DOCUMENTS

| | | |
|---|---|---|
| 4,448,131 A | 5/1984 | Weiland et al. |
| 6,338,300 B1 | 1/2002 | Landrot |
| 7,328,660 B2 | 2/2008 | Landrot |
| 2012/0267835 A1 | 10/2012 | Drabon et al. |

FOREIGN PATENT DOCUMENTS

| | | | | |
|---|---|---|---|---|
| EP | 0 242 552 A2 | | 10/1987 | |
| EP | 0373389 | * | 11/1989 | ............ B60G 11/113 |
| EP | 0 373 389 A2 | | 6/1990 | |
| EP | 0 851 142 A1 | | 7/1998 | |
| EP | 0851142 | * | 7/1998 | .............. F16F 1/368 |
| JP | A-47-654 | | 1/1972 | |
| JP | S48-67652 A | | 9/1973 | |
| JP | A-56-90771 | | 7/1981 | |
| JP | A-56-94040 | | 7/1981 | |
| JP | U-56-122838 | | 9/1981 | |
| JP | A-57-90433 | | 6/1982 | |
| JP | S58-21034 A | | 2/1983 | |
| JP | A-61-143257 | | 6/1986 | |
| JP | S63-11937 U | | 1/1988 | |
| JP | H05-330426 A | | 12/1993 | |
| JP | H07-45889 B2 | | 5/1995 | |
| JP | A-9-301163 | | 11/1997 | |
| WO | 2004/003403 A1 | | 1/2004 | |
| WO | 2011/072652 A1 | | 6/2011 | |

OTHER PUBLICATIONS

International Search Report issued in International Patent Application No. PCT/JP2012/005837 mailed Dec. 11, 2012.
Jan. 14, 2014 Office Action issued in Japanese Application No. 2013-533506.
Aug. 19, 2015 Office Action issued in Chinese Application No. 201280044504.2.

\* cited by examiner

RAILCAR BOGIE PLATE SPRING

TECHNICAL FIELD

The present invention relates to a railcar bogie plate spring used in, for example, an axle arm type bogie of a railcar and containing fiber reinforced plastic, in particular, carbon fiber reinforced plastic (CFRP) as a primary material.

BACKGROUND ART

A bogie of a railcar has been an important device that influences a running performance and ride quality of the railcar. As a basic function and performance, the bogie has an important role of smoothly travelling on the tracks while supporting a carbody, on which passengers, cargos, and the like are loaded, from under the carbody.

Therefore, the bogie is constituted by: an electric motor as a drive mechanism; brakes; wheels; axles; bolster springs (air springs) for running stability; axle springs; and a bogie frame that supports these components.

Nowadays, a "bolsterless bogie" not including a bolster beam (bolster) provided between the carbody and the bogie frame has been developed from a conventional "bolster beam type bogie" including the bolster beam (bolster) provided between the carbody and the bogie frame, and in particular, an "axle arm type bogie" is becoming mainstream (see PTL 1 (Japanese Laid-Open Patent Application Publication No. 9-301163), for example).

The axle arm type bogie receives the entire load of the railcar in order of a cross beam of the carbody, a bolster beam, a bolster spring (air spring), a bogie frame, an axle spring, an axle box, an axle, a wheel, and a rail. FIG. 12 is a partial enlarged to view schematically showing this axle arm type bogie, and FIG. 13 is an arrow view when viewed from a direction A of FIG. 12.

A bogie 100 includes: a pair of side sills 102 and 104 arranged parallel to the rail; and a pair of cross beams 106 and 108 arranged between the side sills 102 and 104 so as to be parallel to a sleeper of the rail.

Axles 110 and wheels 112 are arranged between the side sills 102 and 104 so as to be rotatably attached to the side sills 102 and 104 via axle boxes 114. To transfer a pulling force and a brake force between the bogie 100 and each of the axle boxes 114, each of axle box suspensions 120 rotatably attached by shall portions 118 is interposed between the side sill 102 or 104 and the axle box 114 so as to be movable in an upper-lower direction in accordance with an operation of each of coil-shaped axle springs 116. Fifty percent of the entire weight of the railcar is the weight of the bogie, and the bogie is constituted by a steel structure large frame and steel springs.

CITATION LIST

Patent Literature

PTL 1: Japanese Laid-Open Patent Application Publication No. 9-301163

SUMMARY OF INVENTION

Technical Problem

According to this conventional axle arm type bogie 100, fifty percent of the entire weight of the railcar is the weight of the bogie, and the bogie 100 is constituted by the side sills 102 and 104 and the cross beams 106 and 108 as steel structures; and the axle springs 116 as steel springs. Therefore, the weight of the bogie 100 inevitably becomes heavy.

The side sills 102 and 104 and the cross beams 106 and 108 are welded and assembled by complex welding operations and assembling operations, so that skills and a machining time are required. Thus, the cost and time are required.

As the axle springs 116, steel plate springs have been conventionally used, and to obtain the characteristics of springs, laminated plate springs have been used. However, coil springs are currently used instead. To be specific, a single steel spring is too heavy, and vibration damping does not occur. Because of these difficult problems, the steel spring is not used in recent years.

The single spring is problematic as described above, and since it is difficult to obtain both an adequate strength and a low spring constant, the laminated spring has been used. However, in the case of the laminated plate spring, the number of parts increases, and this deteriorates the ease of assembly. Therefore, cumbersome operations need to be performed and it requires time. Further, the cost is high.

In view of these circumstances, an object of the present invention is to provide a railcar bogie plate spring, by which the cost and time can be reduced since skillful welding and assembling operations are not required unlike conventional eases, by which the structure of the bogie can be simplified and the weight and cost can be reduced since heavy steel side sills are not required, whose life is long, and whose durability is improved.

Solution to Problem

A railcar bogie plate spring of the present invention includes: an upper surface member constituted by fiber reinforced plastic in which reinforced fibers are stacked so as to extend in a longitudinal direction; a lower surface member constituted by fiber reinforced plastic in which reinforced fibers are stacked so as to extend it the longitudinal direction; and a core member arranged between the upper surface member and the lower surface member, wherein the core member is constituted by fiber reinforced plastic in which: reinforced fibers are stacked in a width direction perpendicular to a stack direction of the upper surface member and the lower surface member; and in a side view of the core member, the reinforced fibers are inclined relative to a bending neutral axis so as to intersect with one another.

In a case where a bending load is applied to a plate spring, a compressive load is mainly applied to an upper surface of the plate spring, a tensile load is mainly applied to a lower surface of the plate spring, and a shear load is mainly applied to a middle portion of the plate spring. According to the present invention, the upper surface member that receives the compressive load is constituted by the fiber reinforced plastic, in particular, carbon fiber reinforced plastic (CFRP), in which the reinforced fibers are stacked so as to extend in the longitudinal direction, and the lower surface member that receives the tensile load is constituted by the fiber reinforced plastic in which the reinforced fibers are stacked so as to extend in the longitudinal direction.

The core member that receives the shear load is constituted by the fiber reinforced plastic in which: the reinforced fibers are stacked in the width direction perpendicular to the thickness direction (stack direction) of the upper surface member and the lower surface member; and in the side view of the core member, the reinforced fibers are inclined relative to the bending neutral axis so as to intersect with one another. Interlayer portions (adhesion layers) are provided among these members.

Therefore, since the reinforced fibers are oriented in a direction appropriate for the load, the railcar bogie plate spring is reduced in weight while obtaining necessary strength. In addition, the strengths of these members are set properly. With this, when the applied load exceeds a maximum limit load, the breakage is started in order of the interlayer portion, the upper surface member, and the lower surface member. Thus, the breaking does not occur at once.

The compressive strength of the fiber reinforced plastic, in particular, the carbon fiber reinforced plastic (CFRP), is weaker than the tensile strength thereof by about 50%. However, in the present invention, the core member is constituted by the fiber reinforced plastic in which: the reinforced fibers are stacked in the width direction perpendicular to the thickness direction (stack direction) of the upper surface member and the lower surface member; and in the side view of the core member, the reinforced fibers are inclined relative to the bending neutral axis.

By optimally designing the cross sections of the core member, the upper surface member, and the lower surface member as above, these members become optimal with respect to the compressive load, the tensile load, and the shear load. Thus, the plate spring that is the lightest and has an arbitrary spring constant can be realized.

Further, in the case of the metal plate spring, a single spring is problematic and difficult to use, so that a laminated spring is used. However, according to the railcar bogie plate spring of the present invention, a single spring as a composite plate spring is realized because the degree of freedom of the shape design is high, and the fiber reinforced plastic, in particular, the carbon fiber reinforced plastic (CFRP) has a lower elastic modulus and a higher intensity as material physical properties.

Further, the springs, the bogie frame, and the like made of metal has problems of metal fatigue. However, according to the present invention, by properly setting the safety factor as above, the fiber reinforced plastic, in particular, the carbon fiber reinforced plastic (CFRP) is not reduced in intensity by fatigue so much as compared to the metal, so that the long life can be realized.

Therefore, the present invention can provide the railcar bogie plate spring, by which the cost and time can be reduced since skillful welding and assembling operations are not required unlike conventional cases, by which the structure of the bogie can be simplified and the weight and cost can be reduced since heavy steel side sills are not required, whose life is long, and whose durability is improved.

The railcar bogie plate spring may be configured such that in the side view of the core member, the reinforced fibers of the core member are inclined at 45° relative to the bending neutral axis.

As above, the core member is provided between the upper surface member and the lower surface member to receive the shear load, and in a side view of the core member, the reinforced fibers of the core member are inclined relative to the bending neutral axis at 45°. With this, the railcar bogie plate spring becomes optimal with respect to the shear load. Thus, the plate spring that is the lightest and has an arbitrary high stiffness (spring constant) can be realized.

The railcar bogie plate spring may be configured such that a lower surface of the railcar bogie plate spring is constituted by: straight portions respectively extending from end portions of the railcar bogie plate spring toward a center of the railcar bogie plate spring so as to be inclined downward; and an arc-shaped portion formed at a middle portion between the straight portions.

In a case where the plate spring is formed by bending a thick plate made of the carbon fiber reinforced plastic (CFRP), interlayer strength (interlayer shear strength and interlayer adhesive strength) is inadequate. To be specific, in a case where the plate spring curves in a circular-arc shape in a side view in a bending direction, and the plate spring is bent in such a direction that the circular arc becomes large, the layers are separated from one another, and the plate spring becomes weak.

However, since the lower surface of the railcar bogie plate spring is constituted by: the straight portions respectively extending from the end portions of the railcar bogie plate spring toward the center of the railcar bogie plate spring so as to be inclined downward; and the arc-shaped portion formed at the middle portion between the straight portions, the interlayer strength (the interlayer shear strength and the interlayer adhesive strength) improves.

The railcar bogie plate spring may be configured such that a thickness of the railcar bogie plate spring gradually increases from the end portions toward the center. Since the thickness of the railcar bogie plate spring gradually increases from both end portions toward the center, bending stresses of the upper surface member and the lower surface member can be optimized.

The railcar bogie plate spring may further include a metal protective member provided under the lower surface member. With this configuration, by the metal protective member provided under the lower surface member, the main body portion of the railcar bogie plate spring can be protected so as not to be broken or damaged by stepping stones on the railway track.

The railcar bogie plate spring may further include an elastic member made of an elastic material and interposed between the lower surface member and the protective member. With this configuration, since the elastic member interposed between the lower surface member and the metal protective member has a cushion function, the main body portion of the railcar bogie plate spring can be effectively protected so as not to be broken or damaged by stepping stones on the railway track.

The railcar bogie plate spring may further include a bogie load receiving member provided above the upper surface member. With this configuration, the bogie does not directly contact the main body portion of the railcar bogie plate spring, that is the load of the bogie does not directly act on the main body portion of the railcar bogie plate spring, so that the main body portion of the railcar bogie plate spring can be protected.

The railcar bogie plate spring may further include a buffer member made of an elastic material and interposed between the upper surface member and the bogie load receiving member. With this configuration, since the buffer member made of the elastic material and interposed between the upper surface member and the bogie load receiving member has a cushion function, the bogie does not directly contact the main body portion of the railcar bogie plate spring, that is, the load of the bogie does not directly act on the main body portion of the railcar bogie plate spring, so that the main body portion of the railcar bogie plate spring can be effectively protected.

The railcar bogie plate spring may be configured such that the fiber reinforced plastic is carbon fiber reinforced plastic (CFRP). In consideration of the bending elasticity, the mechanical strength, the durability with respect to the cyclic load, and the like, it is desirable that the fiber reinforced plastic be the carbon fiber reinforced plastic (CFRP).

Advantageous Effects of Invention

The present invention can provide the railcar bogie plate spring, by which the cost and time can be reduced since skillful welding and assembling operations are not required unlike conventional cases, by which the structure of the bogie can be simplified and the weight and cost can be reduced since heavy steel side sills are not required, whose life is long, and whose durability is improved.

DESCRIPTION OF EMBODIMENTS

Figure 1:
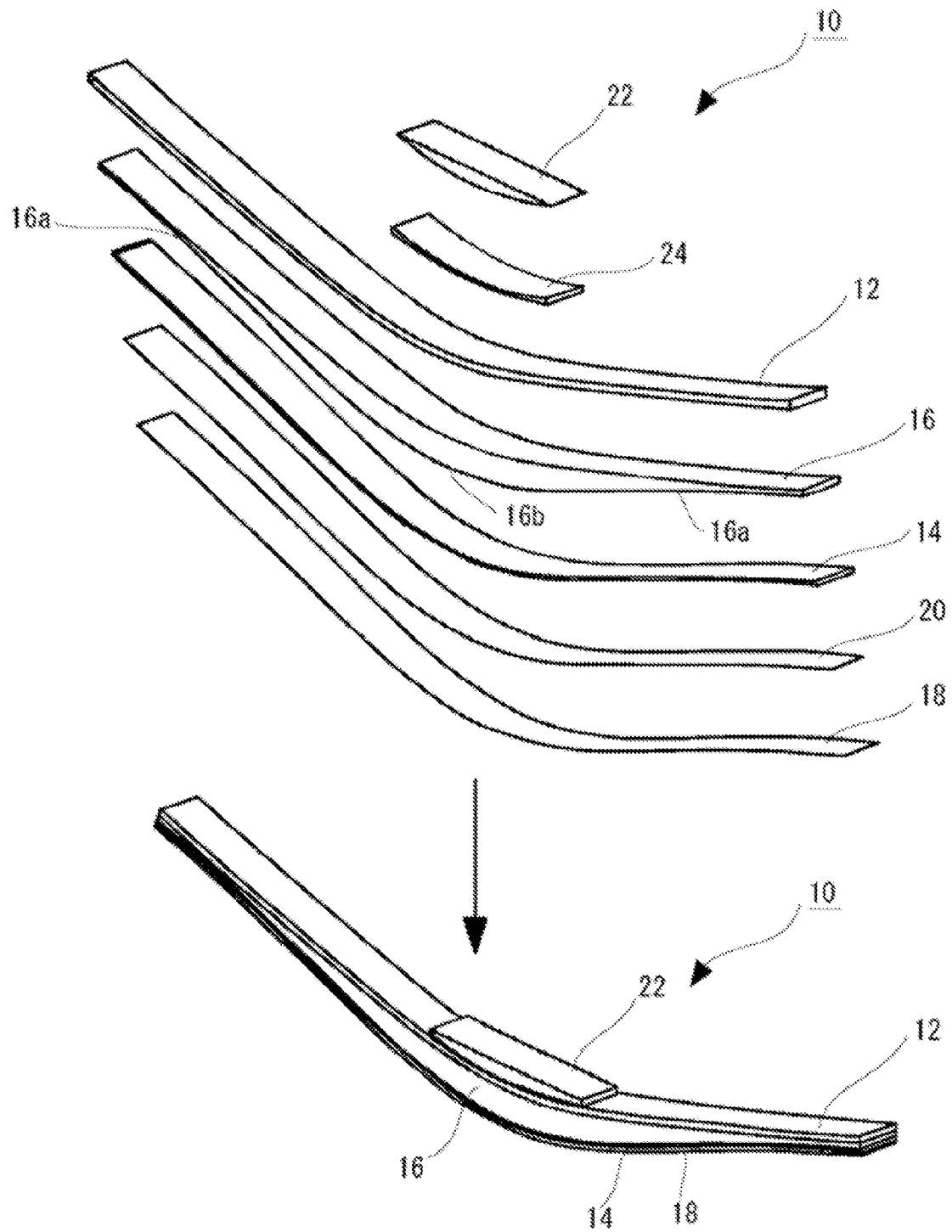
FIG. 1 is an exploded perspective view of a railcar bogie plate spring according to an embodiment of the present invention.
Figure 2:
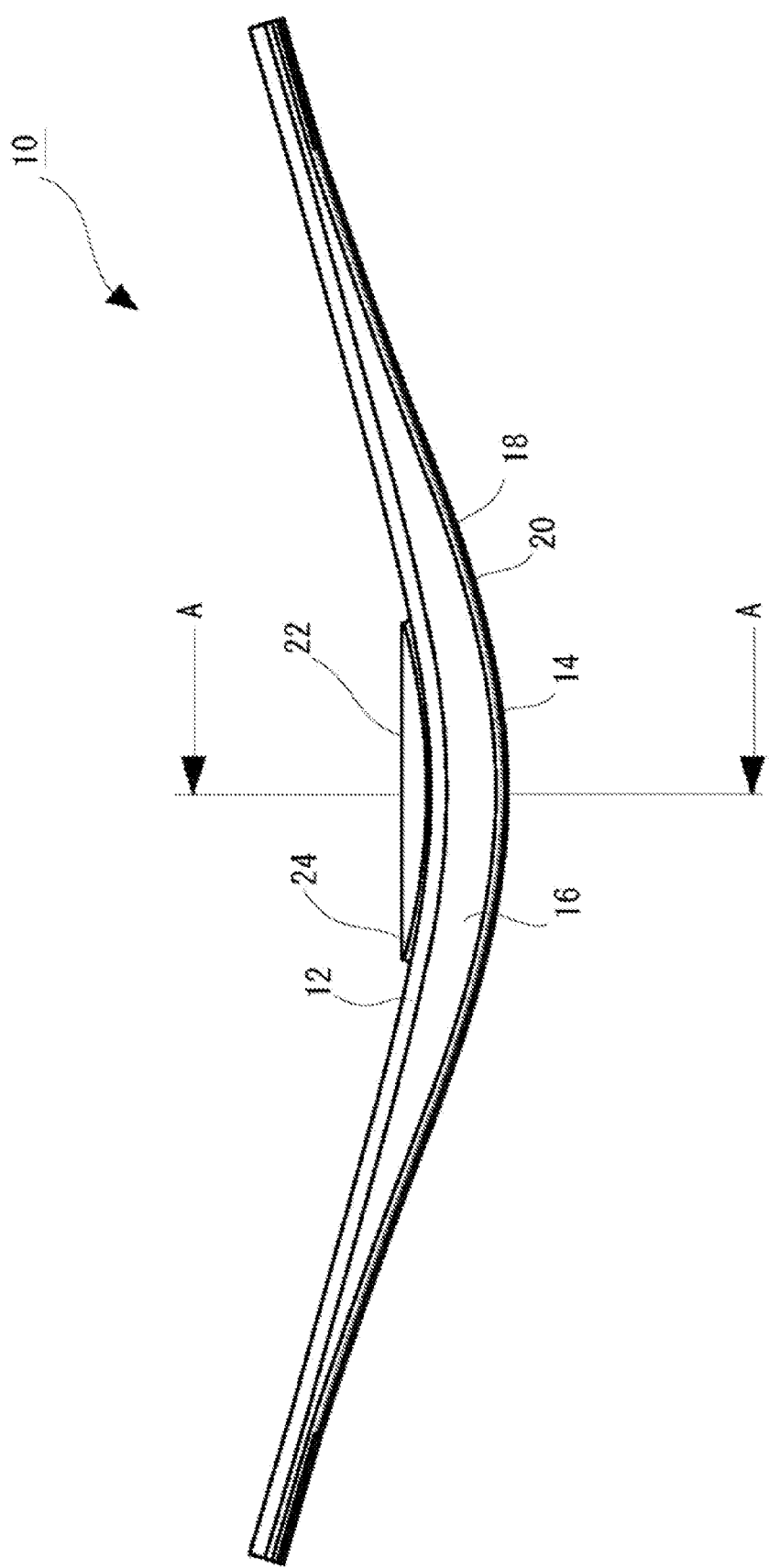
FIG. 2 is a front view of the railcar bogie plate spring according to the present embodiment.
Figure 3:
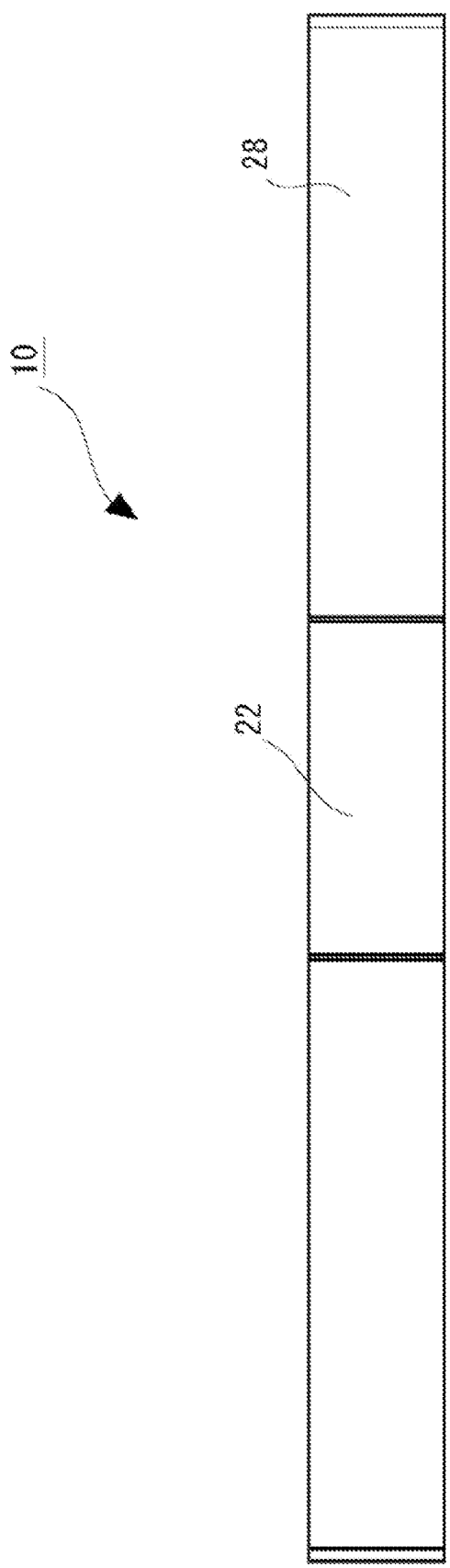
FIG. 3 is a top view of the railcar bogie plate spring of FIG. 2.
Figure 4:
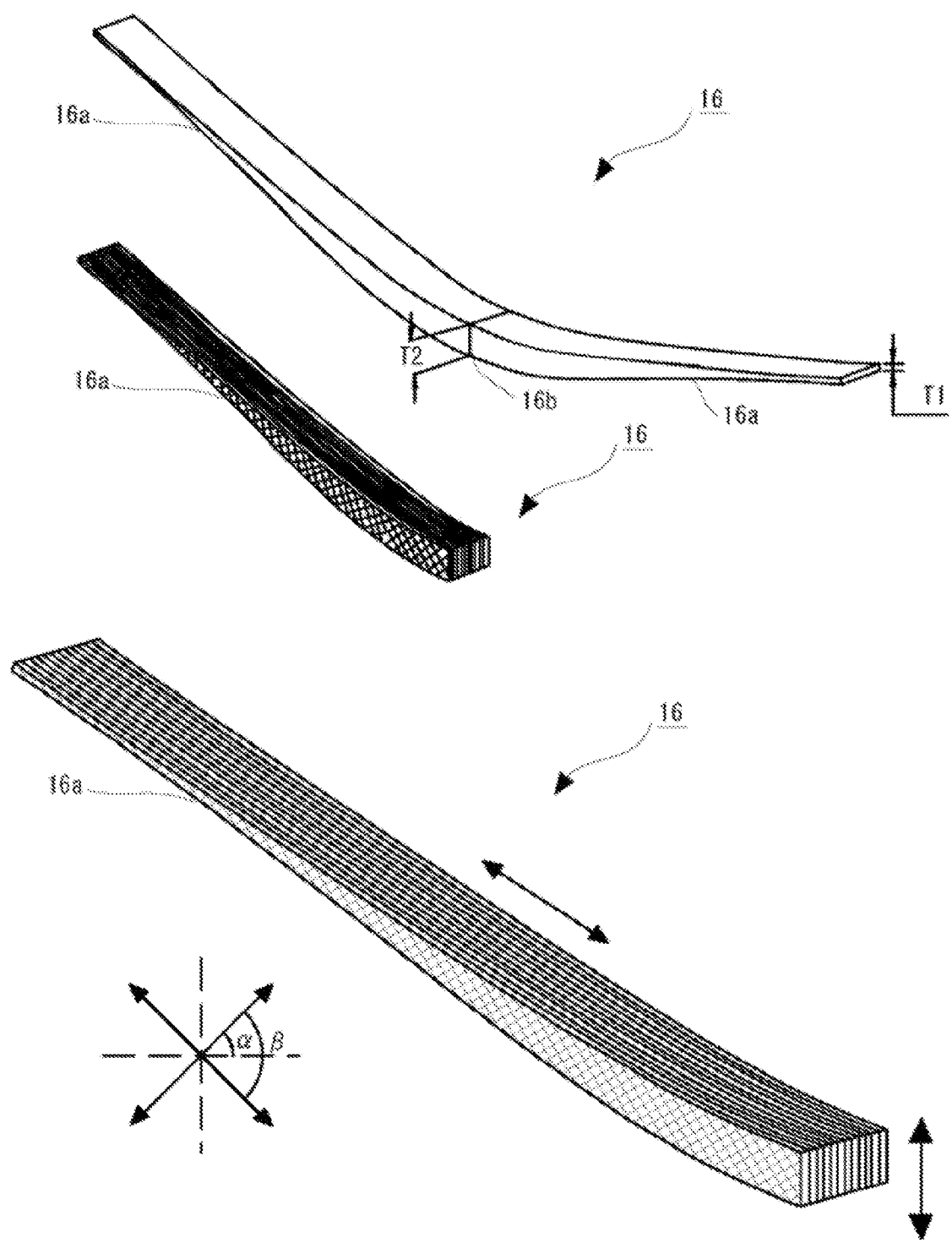
FIG. 4 is a perspective view for explaining the configuration of a core member of the railcar bogie plate spring of FIG. 1.
Figure 5:
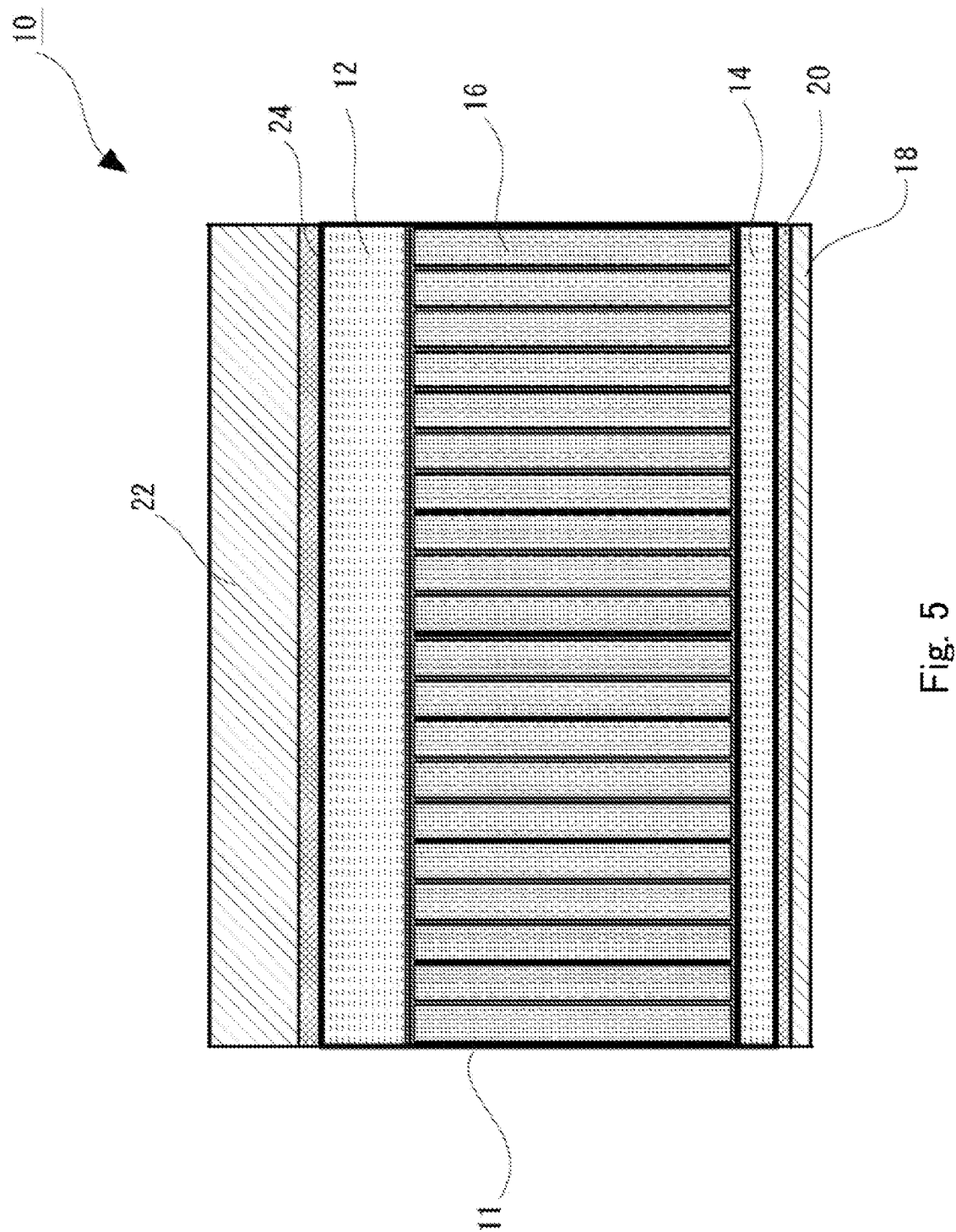
FIG. 5 is a cross-sectional view taken along line A-A of FIG. 2.
Figure 6:
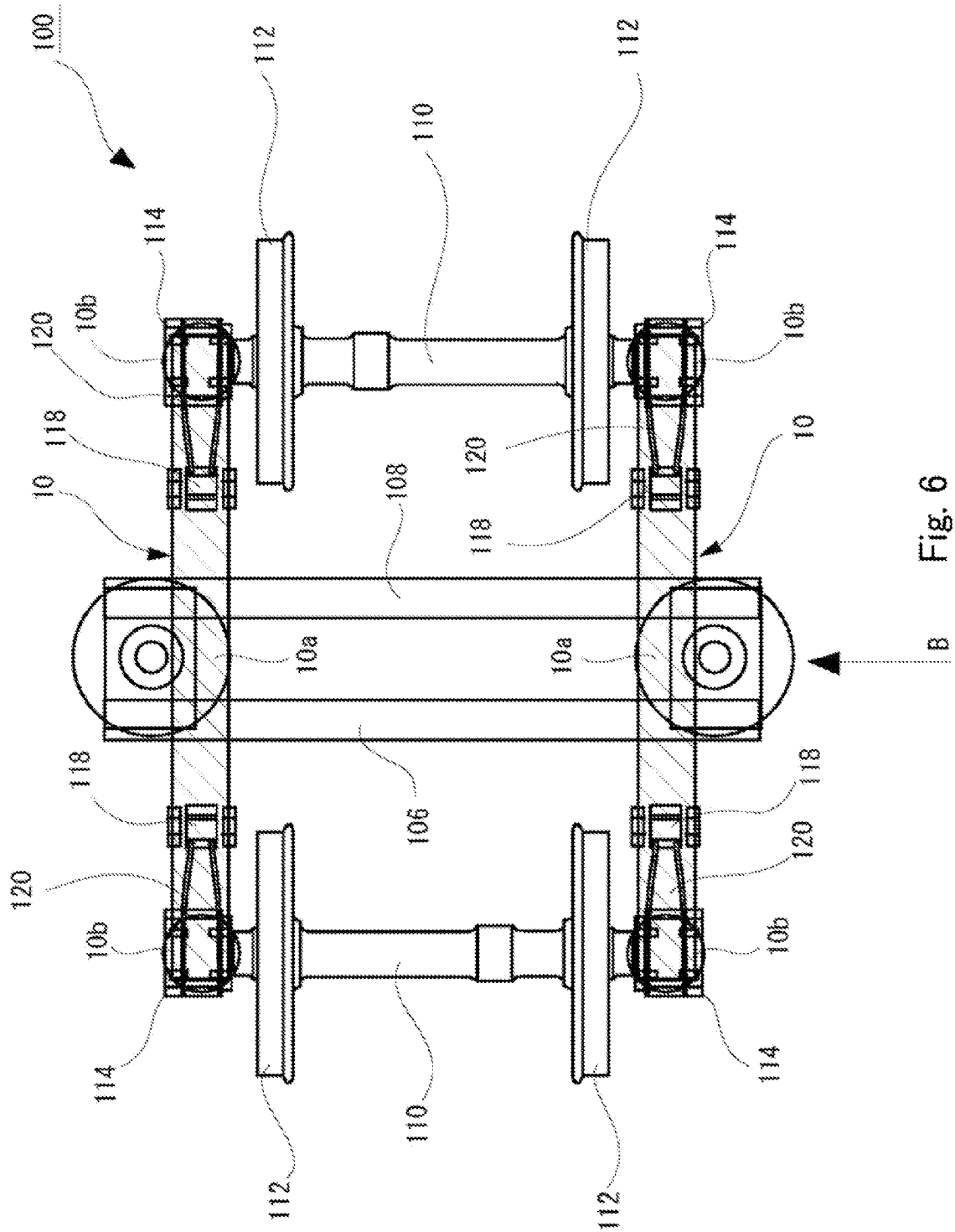
FIG. 6 is a partial enlarged top view schematically showing an axle arm type bogie to which the railcar bogie plate spring according to the present embodiment is applied.
Figure 7:
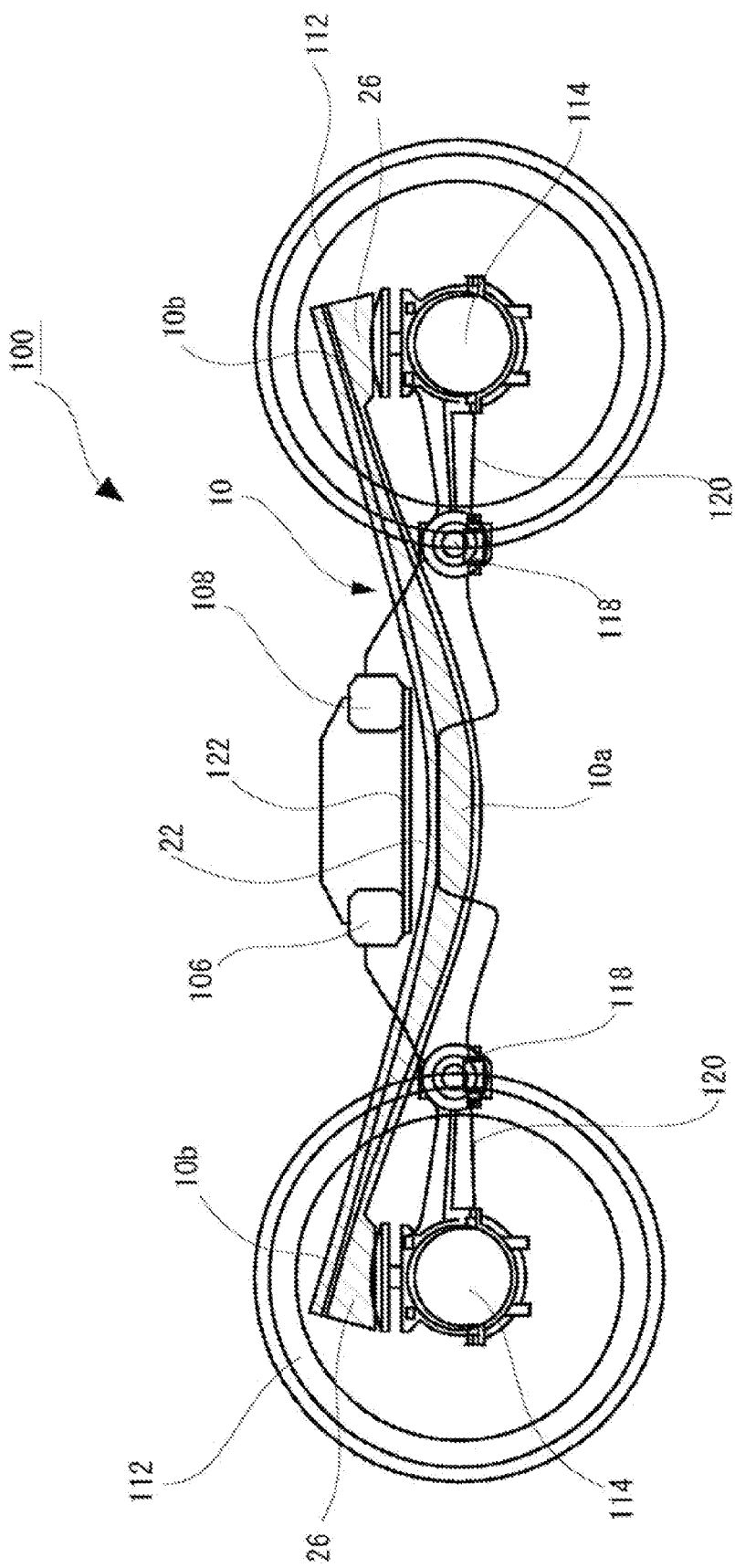
FIG. 7 is an arrow view when viewed from a direction B of FIG. 6.
Figure 8:
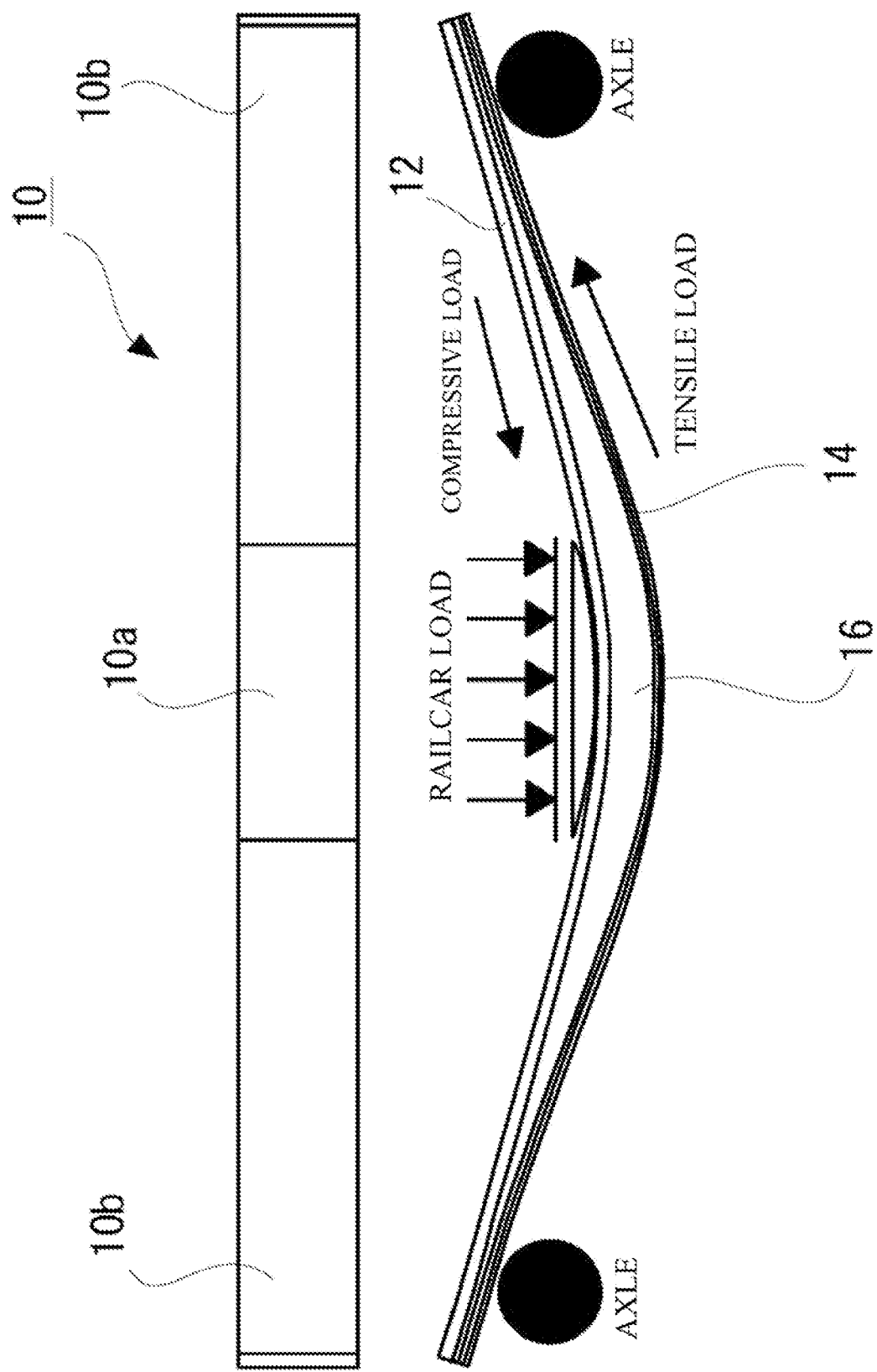
FIG. 8 is as schematic diagram for explaining states of loads in a case where the railcar bogie plate spring according to the present embodiment is applied to the axle arm type bogie.
Figure 9:
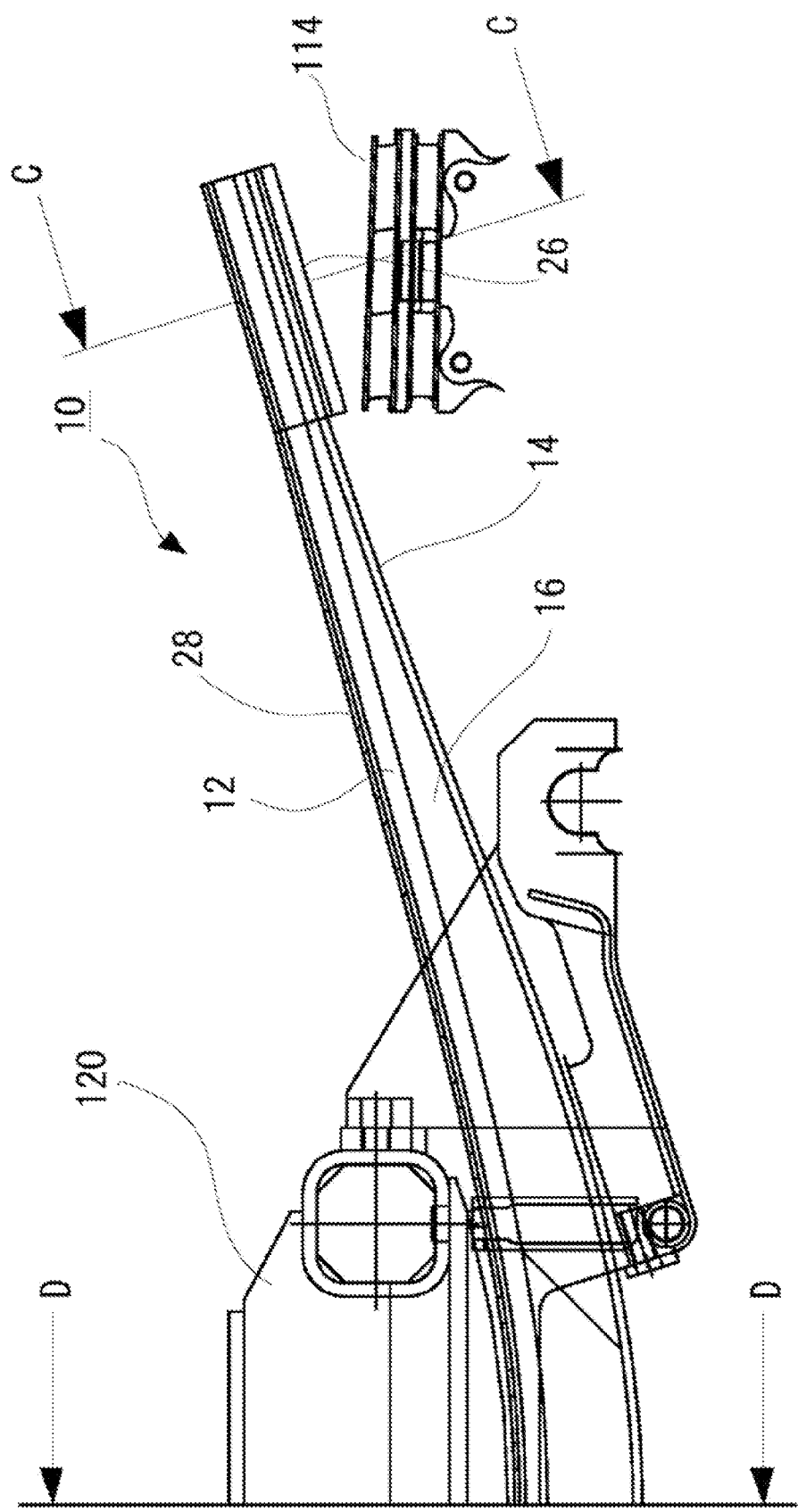
FIG. 9 is a partial enlarged view of FIG. 7.
Figure 10:
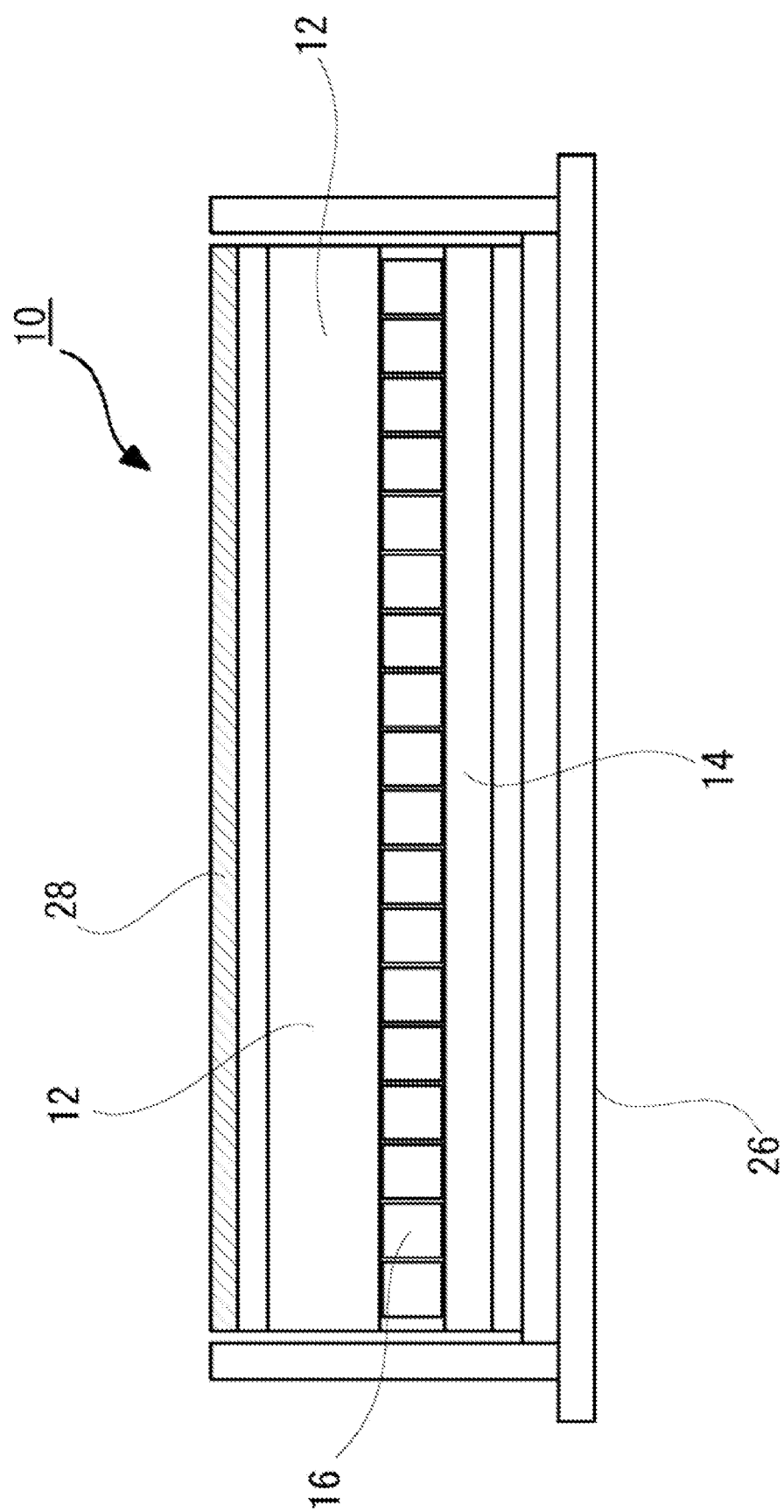
FIG. 10 is a cross-sectional view taken along line C-C of FIG. 9.
Figure 11:
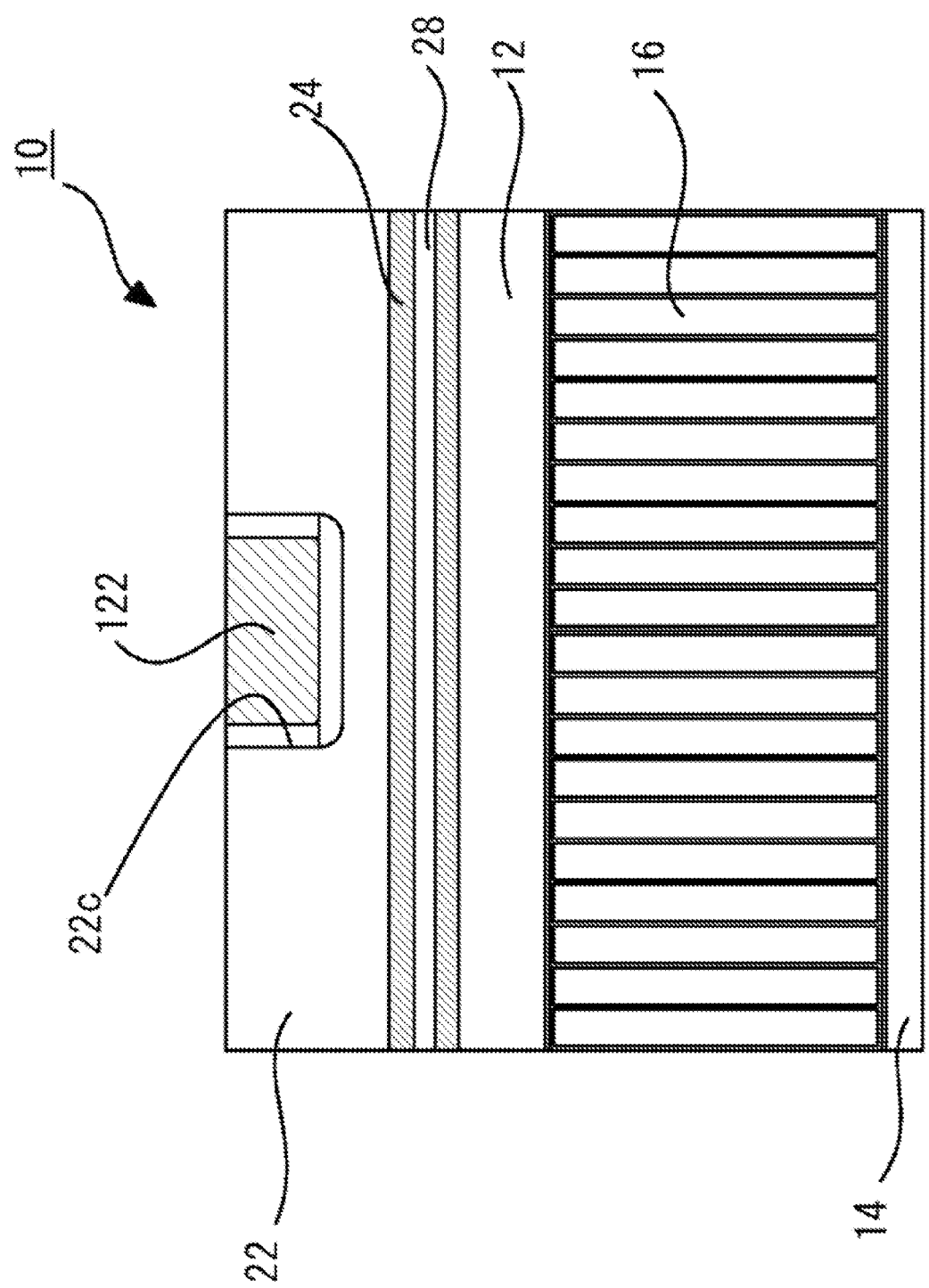
FIG. 11 is a cross-sectional view taken along line D-D of FIG. 9.

Hereinafter, an embodiment (example) of the present invention will be explained in detail in reference to the drawings. FIG. 1 is an exploded perspective view of a railcar bogie plate spring according to the present embodiment. FIG. 2 is a front view of the railcar bogie plate spring according to the present embodiment. FIG. 3 is a top view of the railcar bogie plate spring of FIG. 2. FIG. 4 is a perspective view for explaining the configuration of a core member of the railcar bogie plate spring of FIG. 1. FIG. 5 is a cross-sectional view taken along line A-A of FIG. 2. FIG. 6 is a partial enlarged top view schematically showing an axle arm type bogie to which the railcar bogie plate spring according to the present embodiment is applied. FIG. 7 is an arrow view when viewed from a direction B of FIG. 6. FIG. 8 is a schematic diagram for explaining states of loads in a case where the railcar bogie plate spring according to the present embodiment is applied to the axle arm type bogie. FIG. 9 is a partial enlarged view of FIG. 7. FIG. 10 is a cross-sectional view taken along line C-C of FIG. 9. FIG. 11 is a cross-sectional view taken along line D-D of FIG. 9.

In FIGS. 1 to 3, a reference sign 10 denotes the entire railcar bogie plate spring according to the present embodiment. As shown in FIGS. 1 to 3, a railcar bogie plate spring 10 includes: an upper surface member 12 a lower surface member 14; and a core member 16 arranged between the upper surface member 12 and the lower surface member 14.

As shown in FIG. 1, the upper surface member 12 has an arc-shaped plate spring shape. As shown in FIG. 8, the upper surface member 12 receives a compressive load. As shown in a cross-sectional view of FIG. 5, the upper surface member 12 is constituted by fiber reinforced plastic in which reinforced fibers are stacked so as to extend in a longitudinal direction.

Similarly, as shown in FIG. 1, the lower surface member 14 has an arc-shaped plate spring shape. As shown in FIG. 8, the lower surface member 14 receives a tensile load. As shown in the cross-sectional view of FIG. 5, the lower surface member 14 is constituted by fiber reinforced plastic in which reinforced fibers are stacked so as to extend in the longitudinal direction.

As shown in FIG. 8, the core member 16 receives a shear load and has a substantially arc-shaped plate spring shape. As shown in FIG. 4, a lower surface of the core member 16 is constituted by: straight portions 16a respectively extending from end portions of the railcar bogie plate spring toward a center of the railcar bogie plate spring so as to be inclined downward; and an arc-shaped portion 16b formed at a middle portion between both straight portions 16a. As shown in FIG. 4, an upper surface of the core member 16 is formed in a gentle arc shape.

Further, as shown in FIGS. 4 and 5, the core member 16 is constituted by fiber reinforced plastic in which: reinforced fibers are stacked in a width direction perpendicular to a thickness direction (stack direction) of the upper surface member 12 and the lower surface member 14; and in a side view of the core member 16, the reinforced fibers are inclined (at an inclination angle α) relative to a bending neutral axis (horizontal axis).

In this case, the above expression "inclined (at an inclination angle α) relative to as bending neutral axis (horizontal axis)" denotes that as shown in FIG. 4, fibers intersect with one another at the angle α relative to the horizontal direction.

However, the present embodiment is not limited to a case where as shown in FIG. 4, the fiber inclined at the angle α relative to the horizontal direction is perpendicular to another fiber. For example, the present embodiment includes a ease where the fibers intersect with one another at an arbitrary angle β, such as 30° or 60°.

In this case, it is desirable that in a side view the fiber orientation be such that the reinforced fibers extend so as to intersect with one another at an intersection angle of 45° as the inclination angle α. However, the inclination angle α can be suitably changed in consideration of the shear load received by the core member 16.

In consideration of the shear load received by the core member 16, it is desirable that the inclination angle α relative to the horizontal direction be set to 45° relative to the bending neutral axis (horizontal axis). By optimally designing the cross sections of the core member 16, the upper surface member 12, and the lower surface member 14 as above, these members become optimal with respect to the compressive load, the tensile load, and the shear load. Thus, the plate spring that is the lightest and has an arbitrary spring constant can be realized.

The core member 16 is configured such that the thickness thereof gradually increases from both end portions toward the center. In this case, in order to optimize the core member 16 such that a compressive stress generated at the upper surface member 12 by a bending load and a tensile stress generated at the lower surface member 14 by the bending load become uniform, it is desirable that the core member 16 have a shape similar to a parabolic shape as shown in FIG. 4.

Further, the thickness of the upper surface member 12 and the thickness of the lower surface member 14 are not especially limited. However, it is desirable that each of the thickness of the upper surface member 12 and the thickness of the lower surface member 14 be substantially the same as a thickness T1 of the end portion of the core member 16. In this case, the upper surface member 12, the lower surface member 14, and the core member 16 can be made of the fiber reinforced plastic (FRP) formed by combining a polymeric material, such as plastic, made of thermosetting resin, such as epoxy resin or polyimide resin, and a reinforced fibrous material, such as carbon fibers or aramid fibers and shaping those materials. Examples of the fiber reinforced plastic (FRP) include carbon fiber reinforced plastic (CFRP), glass fiber reinforced plastic (GFRP), glass-mat-reinforced thermoplastic (GMT), aramid fiber reinforced plastic (AFRP), boron fiber reinforced plastic (BFRP), dyneema fiber reinforced plastic (DFRP), and zylon fiber reinforced plastic (ZFRP).

The upper surface member 12, the lower surface member 14, and the core member 16 may be formed by using one type or more out of these fiber reinforced plastics to be stacked on one another. In consideration of bending elasticity, mechanical strength, durability with respect to cyclic loading, and the like, it is especially desirable that the upper surface member 12, the lower surface member 14, and the core member 16 be constituted by the carbon fiber reinforced plastic (CFRP).

It is also desirable that the upper surface member 12, the lower surface member 14, and the core member 16 be formed by using a resin-impregnated material (prepreg material), prepared by impregnating the above reinforced fibrous material with resin, to be stacked on one another. In this case, it is desirable that the stack structure be realized by using a prepreg material in which reinforced fibers are precisely, uniformly extended and arranged in one direction. To be specific, it is desirable that by applying a tension to the reinforced fibers when stacking the reinforced fibers, the reinforced fibers be stacked so as to be arranged as linearly as possible.

In this case, in consideration of mechanical strength and the like, it is desirable to uniformly apply pressure and heat to the reinforced fibers and the resin when curing and combining the reinforced fibers and the resin. A method of shaping the fiber reinforced plastic is not especially limited to the method of realizing the stack structure by using the prepreg material as above. For example, the fiber reinforced plastic may be formed by resin injection molding (RI), such as resin transfer molding (RTM) or vacuum assist resin transfer molding (VARTM).

Further, although not shown, it is desirable that the upper surface member 12, the lower surface member 14, and the core member 16 be adhered to one another by adhesive layers. In this case, the adhesive layer is not especially limited, and a publicly known adhesive may be used. In consideration of workability, it is preferable to use an elastic adhesive.

Examples of the elastic adhesive include elastic structure adhesives, such as a polyurethane-based adhesive, a silicon resin-based adhesive, and an acryl resin-based adhesive.

Further, as shown in a cross-sectional view of FIG. 5, it is desirable that the upper surface member 12, the lower surface member 14, and the core member 16 be covered with an outer periphery protective layer 11 that covers outer peripheries of the upper surface member 12, the lower surface member 14, and the core member 16. In consideration of abrasion resistance, the outer periphery protective layer can be made of, for example, the aramid fiber reinforced plastic.

As shown in FIGS. 1 and 5, it is preferable that a metal protective member 18 be provided under the lower surface member 14. With this configuration, a main body portion (the upper surface member 12, the lower surface member 14, and the core member 16) of the railcar bogie plate spring 10 can be protected by the metal protective member 18, provided under the lower surface member 14, so as to be prevented from being broken or damaged by stepping stones on the railway track.

In this case, a metal material of the protective member 18 is not especially limited. In consideration of durability, corrosivity, and the like, SUS304, SMA400, or the like may be used.

The thickness of the protective member 18 may be set to 1.6 to 6.0 mm, preferably 4.5 mm such that the spring property of the mm body portion of the railcar bogie plate spring 10 is prevented from being inhibited, and the reduction in weight is prevented from being inhibited.

It is desirable that an elastic member 20 made of at elastic material be interposed between the lower surface member 14 and the protective member 18. With this configuration, since the elastic member 20 interposed between the lower surface member 14 and the metal protective member 18 has a cushion function, the main body portion of the railcar bogie plate spring 10 can be effectively protected so as not to be broken or damaged by stepping stones on the railway track.

In this case, the elastic material of the elastic member 20 is not especially limited. Examples of the elastic material include: rubber (polymer materials, such as natural rubber base, synthetic rubber base, urethane base, silicon rubber base, and elastomer resin); elastic adhesives; and polymer materials, such as a silicon-based material, a urethane-based material, and an acryl-based material, having rubber-like elasticity. In view of vibration absorption, impact absorption, and impact strength, a rubber elastic force of the above material as an industrial material is effective. In consideration of workability, the elastic adhesive is preferable among these elastic materials.

Examples of the elastic adhesive include elastic structure adhesives, such as a polyurethane-based adhesive, a silicon resin-based adhesive, and an acryl resin-based adhesive.

Further, as shown in FIGS. 1 and 5, it is desirable that a bogie load receiving member 22 be provided above the upper surface member 12. Since the bogie load receiving member 22 is provided as above, the bogie does not directly contact the main body portion of the railcar bogie plate spring 10, that is, the load of the bogie does not directly act on the main body portion of the railcar bogie plate spring 10. Therefore, the main body portion of the railcar bogie plate spring can be protected.

In this case, the bogie load receiving member 22 is not especially limited. In consideration of the lightweight property, the strength, and the like, it is desirable that the bogie load receiving member 22 be made of the glass fiber reinforced plastic (GFRP). An upper surface of the bogie load receiving member 22 is a flat surface 22a that is flat and receives a load, and a lower surface 22b thereof is formed in an arc shape.

It is desirable that a buffer member 24 made of an elastic material be interposed between the upper surface member 12 and the bogie load receiving member 22. With this configuration, since the buffer member 24 made of the elastic material and interposed between the upper surface member 12 and the bogie load receiving member 22 has a cushion function, the bogie does not directly contact the main body portion of the railcar bogie plate spring, that is, the load of the bogie does not directly act on the main body portion of the railcar bogie plate spring. Therefore, the main body portion of the railcar bogie plate spring can be effectively protected.

The buffer member 24 can be made of the same elastic material as the elastic member 20. As shown in FIGS. 6 and 7, the railcar bogie plate spring 10 configured as above is applicable to the axle arm type bogie.

Figure 12:
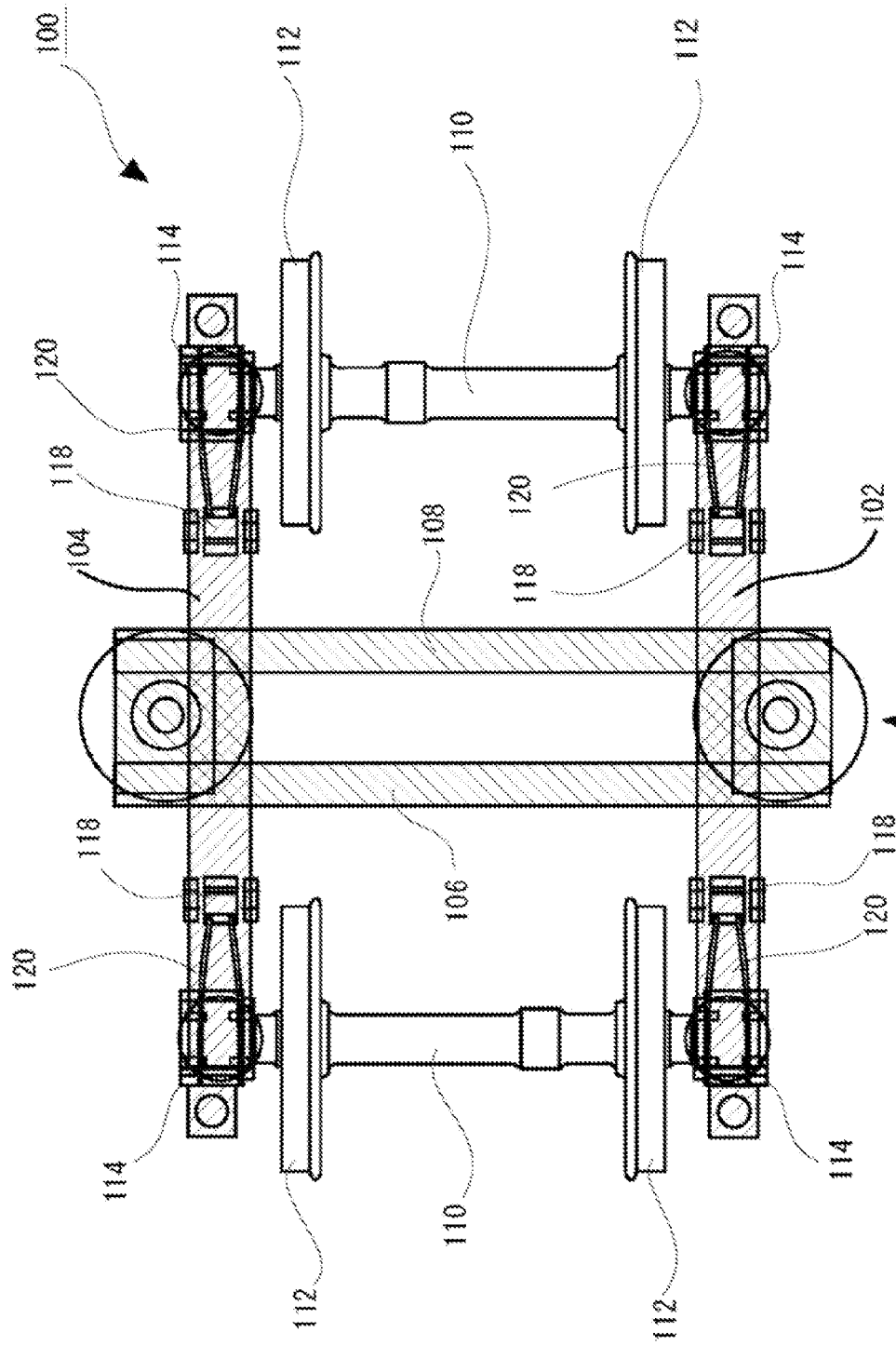
FIG. 12 is a partial enlarged top view schematically showing a conventional axle arm type bogie.
Figure 13:
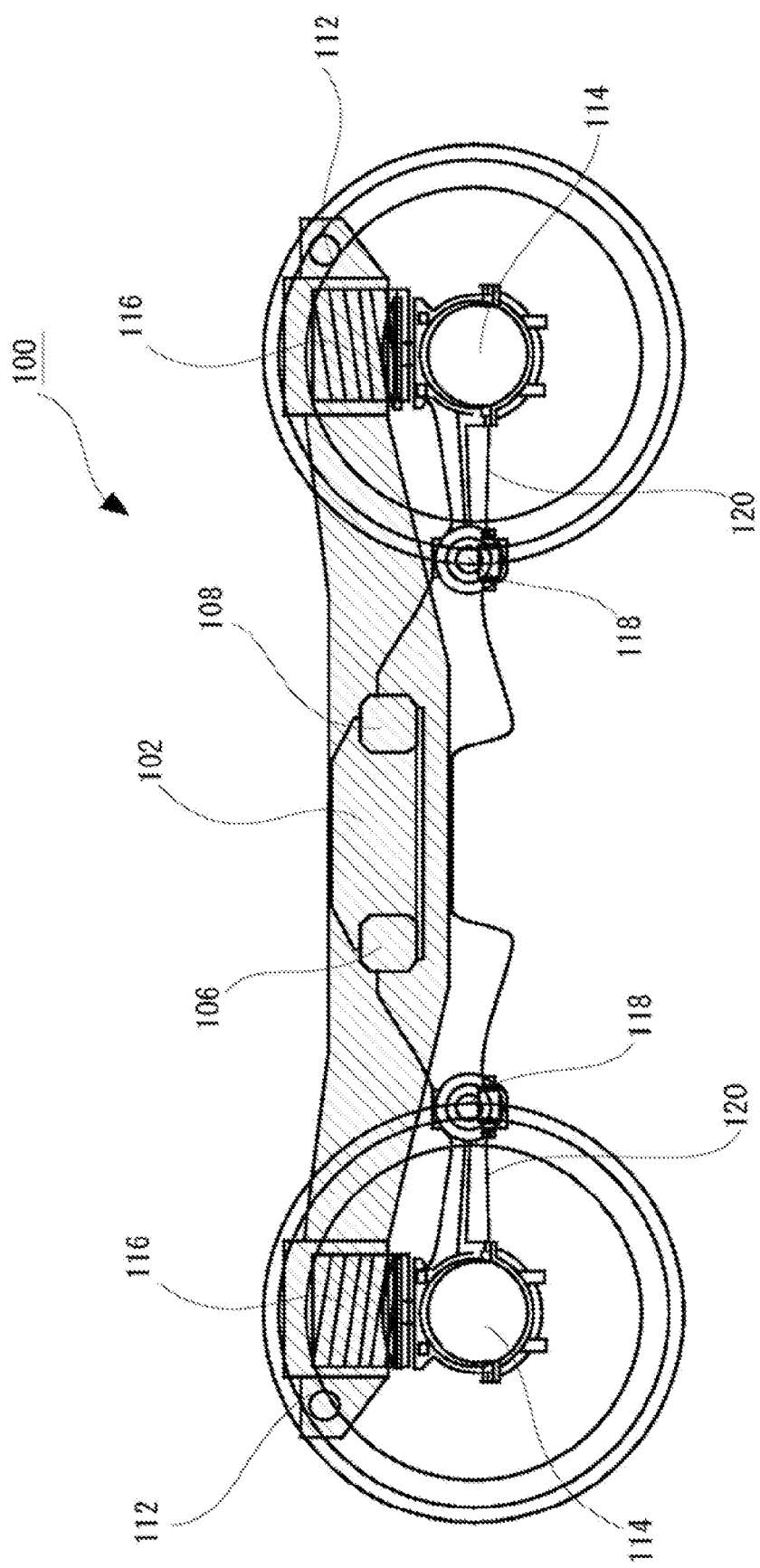
FIG. 13 is an arrow view when viewed from a direction A of FIG. 12.

In FIGS. 6 and 7, the same reference signs are used for the same components as in the conventional axle arm type bogie 100 shown in FIGS. 12 and 13, and detailed explanations thereof are omitted. In this case, the conventional side sills 102 and 104 are omitted, and the railcar bogie plate springs 10 are arranged such that middle portions 10a thereof are arranged under the cross beams 106 and 108, and both end portions 10b thereof respectively contact upper portions of the axle boxes 114.

As shown in FIGS. 7, 9, and 10, end portion load receiving members 26 each made of a metal, such as SM400, and having a substantially U-shaped cross section are respectively provided at both end portions of the railcar bogie plate springs 10. The end portion load receiving members 26 are respectively fixed to the upper portions of the axle boxes 114 by welding.

As shown in FIG. 11, a recess 22c that receives a fixing beam 122 provided under and between the cross beams 106 and 108 is formed on the bogie load receiving member 22 of the middle portion of the railcar bogie plate spring 10. With this, the railcar bogie plate spring 10 is fixed to the fixing beam 122.

As shown in FIGS. 10 and 11, a steel plate member 28 for reinforcement may be interposed between the upper surface member 12 and bogie load receiving member 22 of the railcar bogie plate spring 10.

With this configuration, as shown in FIG. 8, the upper surface member 12 receives the compressive load, the lower surface member 14 receives the tensile load, and the core member 16 receives the shear load.

Therefore, in the railcar bogie plate spring 10 according to the present embodiment, the upper surface member 12 that receives the compressive load is constituted by the fiber reinforced plastic, in particular, the carbon fiber reinforced plastic (CFRP), in which the reinforced fibers are stacked so as to extend in the longitudinal direction, and the lower surface member 14 that receives the tensile load is constituted by the fiber reinforced plastic in which the reinforced fibers are stacked so as to extend in the longitudinal direction.

The core member 16 that receives the shear load is constituted by the fiber reinforced plastic in which: at an upper surface thereof, the reinforced fibers are stacked so as to extend in the longitudinal direction; in a cross section thereof, the reinforced fibers are stacked so as to extend in a thickness direction; and at a side surface thereof, the reinforced fibers are stacked so as to extend and intersect with one another. Interlayer portions (adhesion layers) are provided among these members.

The strengths of these members are set properly. With this, when the applied load exceeds a maximum limit load, the breakage is started in order of the interlayer portion, the upper surface member 12, and the lower surface member 14. Thus, the breaking does not occur at once.

The compressive strength of a thick plate made of carbon fibers is weaker than the tensile strength thereof by about 50%. However, in the present embodiment, the core member 16 is provided between the upper surface member 12 and the lower surface member 14 to receive the shear load, and the core member 16 has the fiber orientation in which: at the upper surface of the core member 16, the reinforced fibers are stacked so as to extend in the longitudinal direction; in the cross section thereof, the reinforced fibers are stacked so as to extend in the thickness direction; and at the side surface, the reinforced fibers are stacked so as to extend and intersect with one another. With this, the railcar bogie plate spring 10 becomes optimal with respect to the shear load. Thus, the plate spring that is the lightest and has an arbitrary high stiffness (spring constant) can be realized.

Further, the springs, the bogie frame, and the like made of metal have problems of metal fatigue. However, by properly setting the safety factor as above, the fiber reinforced plastic, in particular, the carbon fiber reinforced plastic (CFRP) does not cause fatigue, so that the long life can be realized.

Therefore, it is possible to provide the railcar bogie plate spring, by which the cost and time can be reduced since skillful welding and assembling operations are not required unlike conventional cases, by which the structure of the bogie can be simplified and the weight and cost can be reduced since heavy steel side sills are not required, whose life is long, and whose durability is improved.

EXAMPLE 1

The upper surface member 12 was formed in such a manner that: prepregs prepared by impregnating carbon fibers with thermosetting epoxy resin were stacked such that the carbon fibers extended in the longitudinal direction as shown in FIG. 4; and the stack was shaped in a shaping die at a prepreg-designated temperature and pressure for a prepreg-designated period of time.

Similarly, the lower surface member 14 was formed in such a manner that: the prepregs prepared by impregnating the carbon fibers with the thermosetting epoxy resin were stacked such that the carbon fibers extended in the longitudinal direction as shown in FIG. 4; and the stack was shaped at the prepreg-designated temperature and pressure for the prepreg-designated period of time.

Further, the core member 16 was formed by fiber reinforced plastic in which: as shown in FIG. 4, the prepregs prepared by impregnating the carbon fibers with the thermosetting epoxy resin were shaped at the prepreg-designated temperature and pressure for the prepreg-designated period of time, so that the prepregs were stacked in the width direction perpendicular to the thickness direction (stack direction) of the upper surface member 12 and the lower surface member 14; and, in a side view of the core member 16, the carbon fibers were inclined (at the inclination angle α) relative to the bending neutral axis (horizontal axis).

The core member 16 was arranged between the upper surface member 12 and the lower surface member 14, and these members were adhered to one another by using film adhesives. Thus, the railcar bogie plate spring 10 according to the present embodiment was produced (an entire length of 2,400 mm, a width of 180 mm, a middle portion thickness of 100 mm, and an end portion thickness of 40 mm).

A cyclic load testing of the railcar bogie plate spring 10 was performed by using a structure testing device as shown in FIG. 8. As a result, the breakage occurred at 315 kN. This testing verified that the railcar bogie plate spring 10 had an adequate strength as a plate spring for use in a normal railcar bogie.

As is clear from the results of Example 1, the composite plate spring experimentally produced for verification and having a span of 2,100 mm had a spring constant of about 2,800 N/mm (per plate spring) and a breaking load of about 31.5 kN (per plate spring). As above, an adequate basic performance of the railcar bogie plate spring was confirmed.

The weight of the experimentally produced composite plate spring is about 45 kg, so that the significant weight reduction is achieved as compared to the steel laminated plate spring. The experimentally produced composite plate spring is a single plate spring, so that the number of parts is significantly reduced and the ease of assembly is improved as compared to the steel laminated plate spring.

The weight of the composite plate spring to which a steel protective plate is adhered is about 80 kg. Even in this case, the composite plate spring is significantly lighter than the conventional steel plate spring. The foregoing has explained the embodiment of the present invention, but the present invention is not limited to the above embodiment. For example, in Example 1, the main body portion of the railcar bogie plate spring has a three-layer structure in which the core member 16 is interposed between the upper surface member 12 and the lower surface member 14. However, the main body portion of the railcar bogie plate spring may have a four-layer structure or more in which a plurality of upper surface members 12 and a plurality of lower surface members 14 are provided. Further, a metal thin plate member may be interposed and combined between the core members 16 each placed between the upper surface member 12 and the lower surface member 14. As above, various modifications may be made within the object of the present invention.

INDUSTRIAL APPLICABILITY

The present invention relates to a railcar bogie plate spring used in, for example, an axle arm type bogie of a railcar. The present invention is applicable to a railcar bogie plate spring containing fiber reinforced plastic, in particular, carbon fiber reinforced plastic (CFRP) as a primary material, and a railcar bogie including the railcar bogie plate spring.

REFERENCE SIGNS LIST

10 railcar bogie plate spring
10a middle portion
10b end portion
11 outer periphery protective layer
12 upper surface member
14 lower surface member
16 core member
16a straight portion
16b arc-shaped portion
18 protective member
20 elastic member
22 bogie load receiving member
22a flat surface
22b lower surface
22c recess
24 buffer member
26 end portion load receiving member
28 steel plate member
100 bogie
110 axle
112 wheel
114 axle box
116 axle spring
118 shaft portion
120 axle box suspension
α intersection angle

The invention claimed is:

1. A railcar bogie plate spring comprising:
    an upper surface member constituted by a first fiber reinforced plastic including a plurality of first resin-impregnated layers, each first resin-impregnated layer including a plurality of first continuous reinforced fibers extending in at least a lengthwise direction of the first resin-impregnated layer and forming a first continuous sheet of fibrous material, the plurality of first resin-impregnated layers being stacked so that the plurality of first continuous reinforced fibers extend in a longitudinal direction of the railcar bogie plate spring;
    a lower surface member constituted by a second fiber reinforced plastic including a plurality of second resin-impregnated layers, each second resin-impregnated layer including a plurality of second continuous reinforced fibers extending in at least a lengthwise direction of the second resin-impregnated layer and forming a second continuous sheet of fibrous material, the plurality of second resin-impregnated layers being stacked in a stack direction extending from a lower surface of the lower surface member toward an upper surface of the upper surface member so that the plurality of second continuous reinforced fibers extend in the longitudinal direction of the railcar bogie plate spring;
    a core member arranged between the upper surface member and the lower surface member, the core member being constituted by a third fiber reinforced plastic including a plurality of third resin-impregnated layers, each third resin-impregnated layer including a plurality of third continuous reinforced fibers forming a third continuous sheet of fibrous material, the plurality of third resin-impregnated layers being entirely stacked in a width direction perpendicular to the stack direction of the upper surface member and the lower surface member, and in a side view of the core member, the third continuous reinforced fibers of each of the plurality of third resin-impregnated layers are angled relative to a bending neutral axis of the core member so as to intersect with one another; and
    a lower surface of the railcar bogie plate spring is constituted by: (i) straight portions respectively extending from end portions of the railcar bogie plate spring toward a center of the railcar bogie plate spring so as to be angled relative to the bending neutral axis, and (ii) a central concave arc-shaped portion formed at a middle portion between the straight portions, the central concave arc-shaped portion being below the end portions of the railcar bogie plate spring in the stack direction, wherein
    the upper surface member, the lower surface member, and the core member extend continuously from one end to another end of the railcar bogie plate spring.

2. The railcar bogie plate spring according to claim 1, wherein a thickness of the upper surface member is greater than a thickness of the lower surface member.

3. The railcar bogie plate spring according to claim 2, wherein at least the third fiber reinforced plastic is carbon fiber reinforced plastic (CFRP).

4. The railcar bogie plate spring according to claim 1, wherein in the side view of the core member, the third continuous reinforced fibers are angled at 45° relative to the bending neutral axis.

5. The railcar bogie plate spring according to claim 4, wherein at least the third fiber reinforced plastic is carbon fiber reinforced plastic (CFRP).

6. The railcar bogie plate spring according to claim 4, wherein the third continuous reinforced fibers of each of the third resin-impregnated layers are inclined at an angle of 45 degrees relative to the bending neutral axis of the core member.

7. The railcar bogie plate spring according to claim 4, wherein the third continuous reinforced fibers of each of the third resin-impregnated layers are declined at an angled of 45 degrees relative to the bending neutral axis of the core member.

8. The railcar bogie plate spring according to claim 4, wherein the third continuous reinforced fibers include a first set of interwoven fibers angled at +45 degrees and a second set of interwoven fibers angled at —minus 45 degrees relative to the bending neutral axis of the core member.

9. The railcar bogie plate spring according to claim 1, wherein a thickness of the railcar bogie plate spring gradually increases from the end portions toward the center.

10. The railcar bogie plate spring according to claim 9, wherein at least the third fiber reinforced plastic is carbon fiber reinforced plastic (CFRP).

11. The railcar bogie plate spring according to claim 1, further comprising a metal protective member provided under the lower surface member.

12. The railcar bogie plate spring according to claim 11, further comprising an elastic member made of an elastic material and interposed between the lower surface member and the protective member.

13. The railcar bogie plate spring according to claim 12, wherein at least the third fiber reinforced plastic is carbon fiber reinforced plastic (CFRP).

14. The railcar bogie plate spring according to claim 11, wherein at least the third fiber reinforced plastic is carbon fiber reinforced plastic (CFRP).

15. The railcar bogie plate spring according to claim 1, further comprising a bogie load receiving member provided above the upper surface member.

16. The railcar bogie plate spring according to claim 15, wherein at least the third fiber reinforced plastic is carbon fiber reinforced plastic (CFRP).

17. The railcar bogie plate spring according to claim 1, wherein at least the third fiber reinforced plastic is carbon fiber reinforced plastic (CFRP).

18. A railcar bogie plate spring comprising:
  an upper surface member constituted by fiber reinforced plastic in which reinforced fibers are stacked so as to extend in a longitudinal direction;
  a lower surface member constituted by fiber reinforced plastic in which reinforced fibers are stacked so as to extend in the longitudinal direction; and
  a core member arranged between the upper surface member and the lower surface member, wherein:
  the upper surface member, the lower surface member, and the core member extend continuously from one end to the other end of the railcar bogie plate spring;
  the core member is constituted by fiber reinforced plastic in which reinforced fibers are entirely stacked in a width direction perpendicular to a stack direction of the upper surface member and the lower surface member, and in a side view of the core member, the reinforced fibers are inclined relative to a bending neutral axis so as to intersect with one another;
  a lower surface of the railcar bogie plate spring is constituted by straight portions respectively extending from end portions of the railcar bogie plate spring toward a center of the railcar bogie plate spring so as to be inclined downward and an arc-shaped portion formed at a middle portion between the straight portions;
  a bogie load receiving member is provided above the upper surface member; and
  a buffer member made of an elastic material is interposed between the upper surface member and the bogie load receiving member.

19. The railcar bogie plate spring according to claim 18, wherein at least the third fiber reinforced plastic is carbon fiber reinforced plastic (CFRP).

* * * * *